(12) United States Patent
Braun et al.

(10) Patent No.: US 7,765,990 B2
(45) Date of Patent: Aug. 3, 2010

(54) DEVICE FOR DELIVERING FUEL FROM A TANK TO AN INTERNAL COMBUSTION ENGINE

(75) Inventors: Hans-Peter Braun, Renfrizhausen (DE); Thomas Wieland, Stuttgart (DE); Petr Simek, Hrdejovice (CZ); Pavel Motka, Postrelmov (CZ)

(73) Assignee: Robert Bosch GmbH, Stuttgart (DE)

( * ) Notice: Subject to any disclaimer, the term of this patent is extended or adjusted under 35 U.S.C. 154(b) by 482 days.

(21) Appl. No.: 11/587,574

(22) PCT Filed: Apr. 28, 2005

(86) PCT No.: PCT/EP2005/051937

§ 371 (c)(1),
(2), (4) Date: Nov. 19, 2007

(87) PCT Pub. No.: WO2005/108146

PCT Pub. Date: Nov. 17, 2005

(65) Prior Publication Data

US 2008/0127948 A1   Jun. 5, 2008

(30) Foreign Application Priority Data

May 4, 2004   (DE) .................. 10 2004 021 919

(51) Int. Cl.
*F02M 37/04*   (2006.01)

(52) U.S. Cl. .................. 123/509; 123/468; 123/469

(58) Field of Classification Search .................. 123/514, 123/510, 509, 468, 469, 495, 506, 511; 137/565.22, 137/565.34
See application file for complete search history.

(56) References Cited

U.S. PATENT DOCUMENTS

| | | | |
|---|---|---|---|
| 5,511,957 A * | 4/1996 | Tuckey et al. .............. 417/313 |
| 5,896,846 A | 4/1999 | Bauer et al. | |
| 6,328,063 B1 * | 12/2001 | Tistchenko ............ 137/565.22 |
| 6,619,272 B2 * | 9/2003 | Jones et al. ................. 123/514 |
| 7,007,678 B2 * | 3/2006 | Schultz et al. ............. 123/509 |
| 7,571,716 B2 * | 8/2009 | Tipton et al. ................ 123/509 |
| 2002/0026927 A1 | 3/2002 | Yoshioka et al. | |

FOREIGN PATENT DOCUMENTS

| | | |
|---|---|---|
| DE | 196 02 082 A1 | 7/1997 |
| EP | 0 959 242 A1 | 11/1999 |
| EP | 1 186 772 A2 | 3/2002 |

OTHER PUBLICATIONS

"Rav4 Uses Jet Pump in Divided Fuel Tank", Machine Design, Feb. 22, 1996, p. 33, vol. 68, No. 4, Penton/IPC, XP000556027, ISSN: 0024-9114, Cleveland, USA.

\* cited by examiner

*Primary Examiner*—Stephen K Cronin
*Assistant Examiner*—J. Page Hufty
(74) *Attorney, Agent, or Firm*—Ronald E. Greigg

(57) ABSTRACT

A device for delivering fuel having a delivery unit, a main filter with a filter housing situated downstream of the delivery unit, and a drive line for driving a suction jet pump embodied in the filter housing of the main filter. As a result, the assembly and manufacture costs of the device are reduced.

8 Claims, 5 Drawing Sheets

DEVICE FOR DELIVERING FUEL FROM A TANK TO AN INTERNAL COMBUSTION ENGINE

CROSS-REFERENCE TO RELATED APPLICATION

This application is a 35 USC 371 application of PCT/EP 2005/051937 filed on Apr. 28, 2005.

BACKGROUND OF THE INVENTION

1. Field of the Invention

The invention is directed to an improved device for delivering fuel to an internal combustion engine.

2. Brief Description of the Prior Art

A device for delivering fuel known from EP 0 959 242 B1 has a delivery unit, a main filter with a filter housing situated downstream of the delivery unit, and a drive line for driving a suction jet pump. It is disadvantageous that the drive line must be installed in the device as a separate part. As a result, the assembly and manufacture costs of the device are comparatively high.

SUMMARY AND ADVANTAGES OF THE INVENTION

The device according to the invention has the advantage over the prior art that manufacturing costs can be reduced in a simple manner due to the fact that the drive line is provided in the filter housing of the main filter. The drive line is integrated into the filter housing so that it is no longer necessary to mount any additional, separate supply lines to the suction jet pump.

According to an advantageous embodiment, the filter housing has a filter bowl and a filter lid that closes the filter bowl; the drive line is embodied in the filter bowl and/or in the filter lid.

It is particularly advantageous if the filter bowl has a first shoulder on its end oriented toward the filter lid and the filter lid has a second shoulder on its side oriented toward the filter bowl; the first shoulder and the second shoulder rest against each other in flange fashion. In this manner, the drive line can be integrated into the flange constituted by the first shoulder and the second shoulder.

It is very advantageous if a first segment of the drive line is provided in the first shoulder of the filter bowl and/or in the second shoulder of the filter lid since in this way, a segment of the drive line is provided between the filter bowl and the filter lid and is formed and sealed when the filter bowl and filter lid are joined to each other.

It is also advantageous if a pressure line is provided, leading from the delivery unit via a check valve to the internal combustion engine, the first segment being connected to the pressure line upstream of the check valve. According to this advantageous embodiment, the drive line is equipped with a throttle element and/or an additional prefilter. The throttle element serves to limit the volumetric flow traveling through the suction jet pump. Since the fuel of the drive line was diverted upstream of the main filter and has therefore not yet been finely filtered, the additional prefilter prevents clogging of the throttle element and/or the suction jet pump nozzle.

It is also advantageous if a second segment of the drive line is provided in the filter bowl, extending from the first shoulder of the filter bowl in the direction of a bowl bottom of the filter bowl, since this embodiment allows the filter bowl to be easily manufactured by means of injection molding technique and facilitates its demolding.

It is also advantageous if the filter lid is equipped with an additional segment of the drive line, which leads from a pressure control valve situated downstream of the main filter and is connected to the second segment of the drive line; the first segment of the drive line is sealed off from the second segment by means of a bulkhead. This embodiment makes it possible to change the flow routing in the device in a simple manner by exchanging the filter lid and by providing a bulkhead in the first segment of the drive line. Depending on the choice of the filter lid, it is consequently possible to connect the suction jet pump directly to the pressure line upstream of the main filter or to connect it indirectly via a pressure control valve to the pressure line downstream of the main filter. In this manner, the so-called modular principle is used, which permits various embodiments of the device with as many shared components as possible.

It is also advantageous if the delivery unit has an outlet fitting that protrudes into a filter inlet of the filter housing since this eliminates the need for a separate tube leading from the delivery unit to the filter housing.

It is also advantageous if the filter inlet is flow-connected to the drive line via an opening.

BRIEF DESCRIPTION OF THE DRAWINGS

Exemplary embodiments of the invention will be explained in detail in the subsequent description, taken in conjunction with the drawings, in which.

DESCRIPTION OF THE PREFERRED EMBODIMENTS

Figure 1:
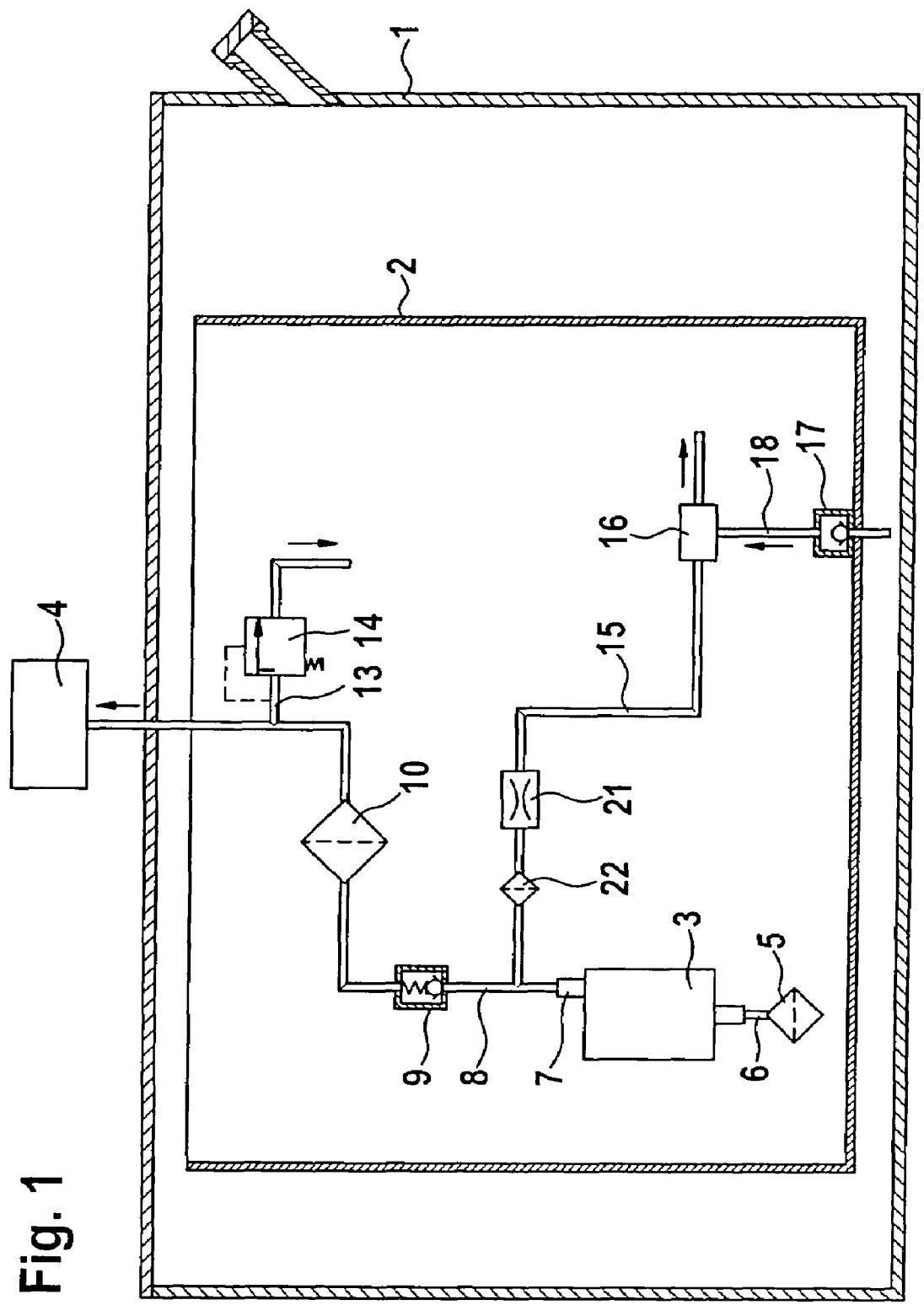
FIG. 1 schematically depicts a device for delivering fuel according to a first embodiment of the invention, FIG. 2 schematically depicts a device for delivering fuel according to a second embodiment.

The device shown is used, for example, to deliver fuel from a tank 1 into a collecting receptacle 2 and from there, via a delivery unit 3 to an internal combustion engine 4 of a motor vehicle.

The collecting receptacle 2 is contained inside the tank 1 and the delivery unit 3 is contained inside the collecting receptacle 2. For example, the delivery unit 3 is a dynamic pump or a displacement pump.

The for example bowl-shaped collecting receptacle 2 stores enough fuel to assure a supply of fuel to the internal combustion engine 4 via the delivery unit 3, even when no fuel is being fed into the collecting receptacle 2, for example during cornering and the accompanying sloshing movements of fuel in the tank 1.

The delivery unit 3 draws fuel from the collecting receptacle 2, for example via a prefilter 5 and an intake line 6, and supplies the fuel via an outlet fitting 7 to a pressure line 8 that leads to the internal combustion engine 4. The prefilter 5 protects the device downstream of the prefilter 5 from coarse dirt particles contained in the fuel.

The pressure line 8 contains a check valve 9 and, downstream of the check valve 9, a main filter 10. When the delivery unit 3 is switched off, the check valve 9 prevents fuel from flowing out of the pressure line 8 downstream check valve 9 to the upstream side of the check valve 9, through the delivery unit 3, the intake line 6, and the prefilter 5, back into the collecting receptacle 2. The main filter 10 filters out fine dirt particles contained in the fuel, thus protecting, for example, the injection valves of the internal combustion engine from becoming clogged.

Downstream of the main filter 10, a pressure relief line 13 containing a pressure control valve 14 branches off from the pressure line 8. If the pressure in the pressure line 8 exceeds a predetermined value, the pressure control valve 14 opens and allows fuel to flow out of the pressure line 8 via the pressure relief line 13 and back into the collecting receptacle 2. In this way, the pressure in the pressure line 8 falls back below the predetermined pressure and the pressure control valve 14 closes again.

Downstream of the delivery unit 3 and upstream of the check valve 9 of the embodiment of FIG. 1, a drive line 15 branches off from the pressure line 8; this drive line 15 serves to supply fuel from the pressure line 8 to a so-called suction jet pump 16 in order to drive it. In order to prevent the delivery unit 3 from emptying the collecting receptacle 2, the suction jet pump 16 feeds fuel from the tank 1 via a flow connection into the collecting receptacle 2, for example via a bottom valve 17 and an intake line 18. The aspirated fuel is supplied together with the so-called motive jet of the drive line 15 into the collecting receptacle 2. A throttle element 21 is provided in the drive line 15 in order to set and limit the volumetric flow traveling via the drive line 15. In order to prevent the throttle element 21 from becoming clogged, and additional prefilter 22 is provided in the drive line 15, upstream of the throttle element 21.

A suction jet pump is known, for example, from DE 198 56 298 C1, whose content is expressly intended to constitute part of the disclosure of the present application.

Figure 2:
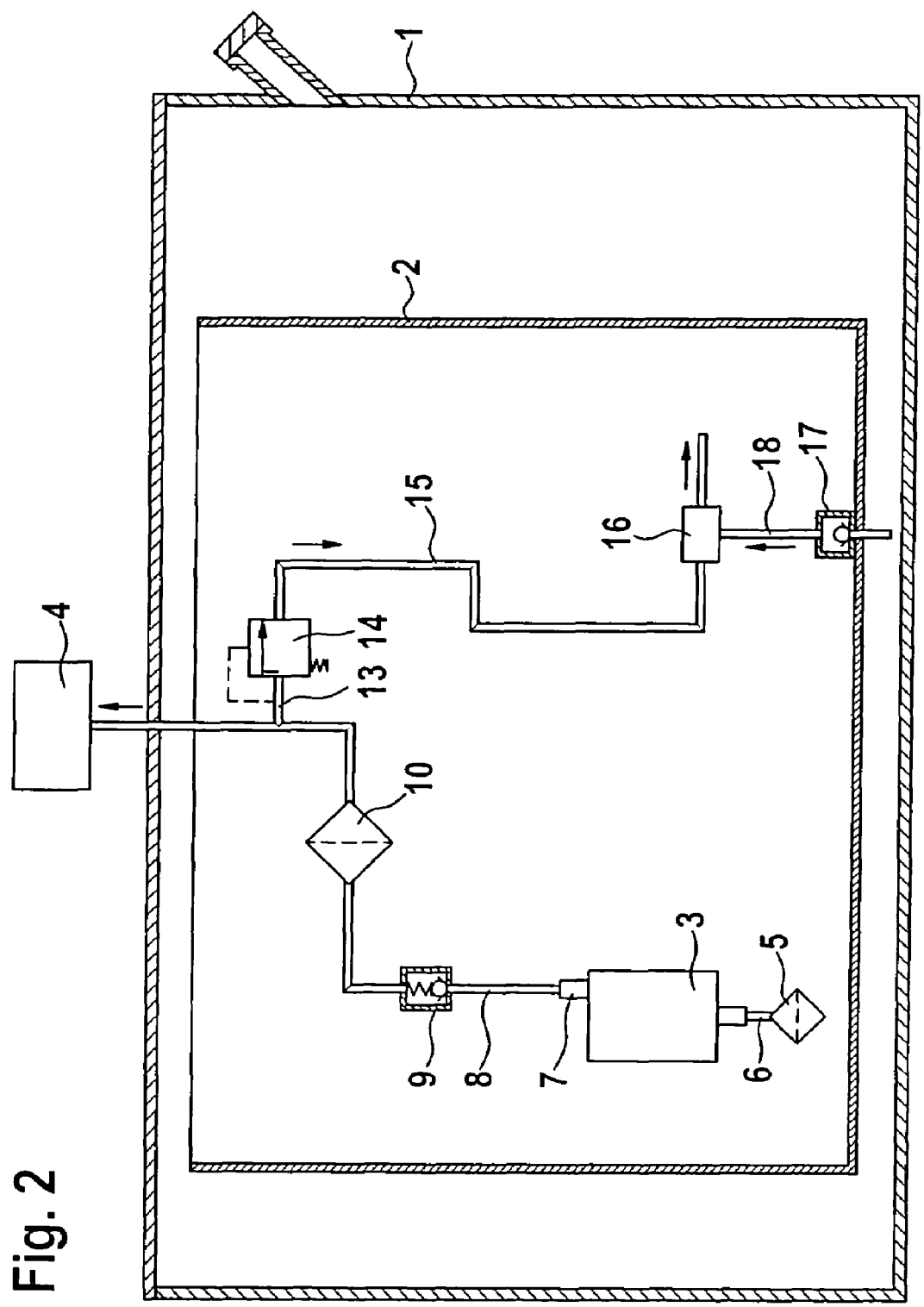

In the device according to FIG. 2, parts that are the same or function in the same manner as those in the device according to FIG. 1 have been provided with the same reference numerals.

The device according to FIG. 2 differs from the device according to FIG. 1 in that the drive line 15 branches off from the pressure line 8 downstream of the main filter 10. In the embodiment according to FIG. 2, the pressure relief line 13 from the embodiment according to FIG. 1 is replaced, downstream of the pressure control valve 14, by the drive line 15 in which the pressure relief valve 14 is provided.

The additional prefilter 22 according to the first embodiment is eliminated because the fuel downstream of the main filter 10 has already been filter by the main filter 10. Since the pressure control valve 14 limits the volumetric flow of the drive line 15, the throttle element 21 can be eliminated in the second embodiment.

Figure 3:
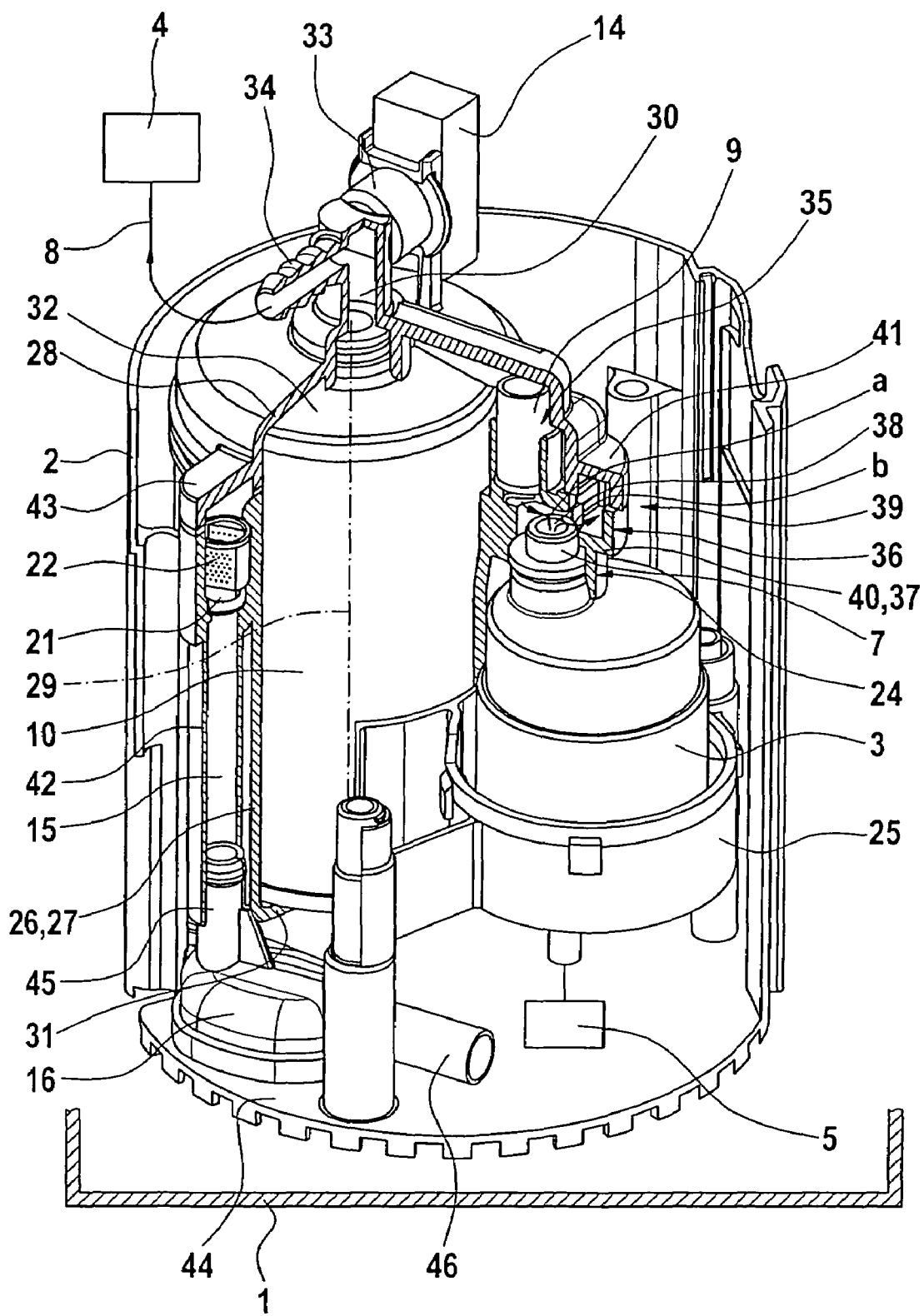
FIGS. 3 and 4 depict a device for delivering fuel according to the first embodiment.

FIG. 3 shows a section through the fuel delivery device according to the invention in the embodiment according to FIG. 1.

In the device according to FIG. 3, parts that are the same or functions in the same manner as those in the device according to FIG. 1 and FIG. 2 have been provided with the same reference numerals.

The delivery unit 3 is contained in a bracket 25 in the collecting receptacle 2.

The main filter 10 contained in the collecting receptacle 2 is provided in a filter housing 26 having, for example, a filter bowl 27 with a bold bottom 31 and having a filter lid 28 that closes the filter bowl 27. For example, the filter housing 26 is situated next to the delivery unit 3.

With the outlet fitting 7, for example, the delivery unit 3 reaches into a filter inlet 24 of the filter housing 26. The fuel exits the delivery unit 3 via the outlet fitting 7, traveling into the filter inlet 24, which is part of the pressure line 8 and is sealed off from the collecting receptacle 2. The pressure line 8 between the outlet fitting 7 and the check valve 9 contains a branch point 36 equipped with a first flow path a and a second flow path b. The branch point 36 is situated, for example, in the filter inlet 24 and leads along a flow path a via the check valve 9 into a filter chamber 32 of the filter housing 26. In the first embodiment according to FIG. 1, the flow path b of the branch point 36 is flow connected to the drive line 15 via an opening 38. The opening 38 is provided in the filter bowl 27 and/or in the filter lid 28.

The check valve 9 is situated in the filter housing 26, for example between the filter lid 28 and the end of the filter bowl 27 oriented toward from the filter lid 28, in a recess 35 of the filter housing 26 that is flow-connected to the filter inlet 24.

The filter chamber 32 contains the main filter 10 through which the fuel flows, for example, from the radial outside to the radial inside in relation to a filter axis 29. The fuel exits the filter chamber 32 at the downstream end via a filter outlet 30 in the direction of the internal combustion engine 4. The filter outlet 30 is embodied in the form of a fitting and is provided, for example, on the filter lid 28. The fitting of the filter outlet 30 is provided, for example, with a valve connection 33 for the pressure control valve 14 and an outlet fitting 34 for connection to the internal combustion engine 4. For example, this results in a T-shaped branch point, the one branch leading to the pressure control valve 14 and the other branch leading to the internal combustion engine 4. The pressure control valve 14 is mounted onto the valve connection 33, e.g. is clipped, screwed, plugged, or welded onto it.

According to the invention, the drive line 15 is embodied in the filter housing 26 of the main filter 10, for example in the filter bowl 27 and/or the filter lid 28, and is produced so that it is integral to this component or components at the time of manufacture. The drive line 15 is integrated into the filter housing 26 so that few or no separate flow lines are required.

According to a first exemplary embodiment, the drive line 15 extends in a for example semi-annular first segment 37 in the circumferential direction and in a second segment 42, extends in the axial direction with regard to the filter axis 29. The first segment 37 and the second segment 42 are provided, for example, on the outer circumference of the filter housing 26.

In terms of its flow cross section, the first segment 37 of the drive line 15 is situated, for example, partially in the filter bowl 27 and partially in the filter lid 28; a closed conduit is produced after the filter bowl 27 and the filter lid 28 are joined to each other. For example, one half of the flow cross section of the first segment 37 is provided in the filter bowl 27 and the other half is provided in the filter lid 28. The first segment 37 can, however, also be embodied so that the flow conduit of the first segment 37 is provided entirely in the filter bowl 27, but is open on the side oriented toward the filter lid 28 so that the filter lid 28 tightly seals the flow conduit on the open side. Likewise, the first segment 37 can also be embodied so that the flow conduit of the first segment 37 is completely contained in the filter lid 28, but is open on the side oriented toward the filter bowl 37 so that the filter bowl 27 tightly seals the flow conduit on the open side.

The filter bowl 27 and the filter lid 28 are attached to each other, for example, by being glued, welded, clipped, screwed, or joined in some other way.

The filter bowl 27 and the filter lid 28 are embodied, for example, in flange fashion at a joining surface 39, the filter bowl 27 having a first shoulder 40 on its end oriented toward the filter lid 28 and the filter lid 28 having a second shoulder 41 oriented toward the filter bowl 27. After the filter bowl 27 is joined to the filter lid 28, the first shoulder 40 and the second shoulder 41 rest snugly against each other.

The first shoulder 40 and the second shoulder 41 extend, for example, in the circumferential direction in relation to the filter axis 29 over at least part of the circumference of the filter housing 26. The shoulders 40, 41 are therefore at least semi-annular in shape; in the region of the filter inlet 24, they extend, for example, around the outlet fitting 7 of the delivery unit 3 and the filter inlet 24 and constitute a second partial ring.

The first segment 37 of the drive line 15 is embodied, for example, in the first shoulder 40 and/or in the second shoulder 41.

For example, the flow cross section of the first segment 37 of the drive line 15 is square, rectangular, polygonal, circular, or oval.

The second segment 42 of the drive line 15 that is flow-connected to the first segment 37 is embodied, for example, only in the filter bowl 27 and extends from the first shoulder 40 in a straight line, for example, and transversely in relation to the first segment 37, in the direction of the bowl bottom 31.

In the vicinity of the transition to the second segment 42 of the drive line 15, the second shoulder 41 of the filter lid 28 has a bulge 43, for example, that is oriented radially outward, overlaps the end of the second segment 42 of the drive line 15 oriented toward the filter lid 28, and seals it tightly. The shape and size of the bulge 43 is adapted to the shape of the second segment 42 of the drive line 15.

The flow cross section of the second segment 42 of the drive line 15 is embodied, for example, as circular, but can also be square, rectangular, polygonal, or oval.

For example, the additional prefilter 22 is provided in the second segment 42 of the drive line 15, for example at the end oriented toward the first segment 37, and the throttle element 21 is situated downstream of the additional prefilter 22. For example, the additional prefilter 22 and the throttle element 21 are integrally connected to each other. The end of the second segment 42 of the drive line 15 oriented toward the bowl bottom 31 is tightly connected to the inlet connection 45 of the suction jet pump 16.

The suction jet pump 16 is situated, for example, on a bottom 44 of the collecting receptacle 2, draws fuel from the tank 1 and supplies it, along with the fuel of the drive line 15, into the collecting receptacle 2 via a mixing conduit 46.

Figure 4:
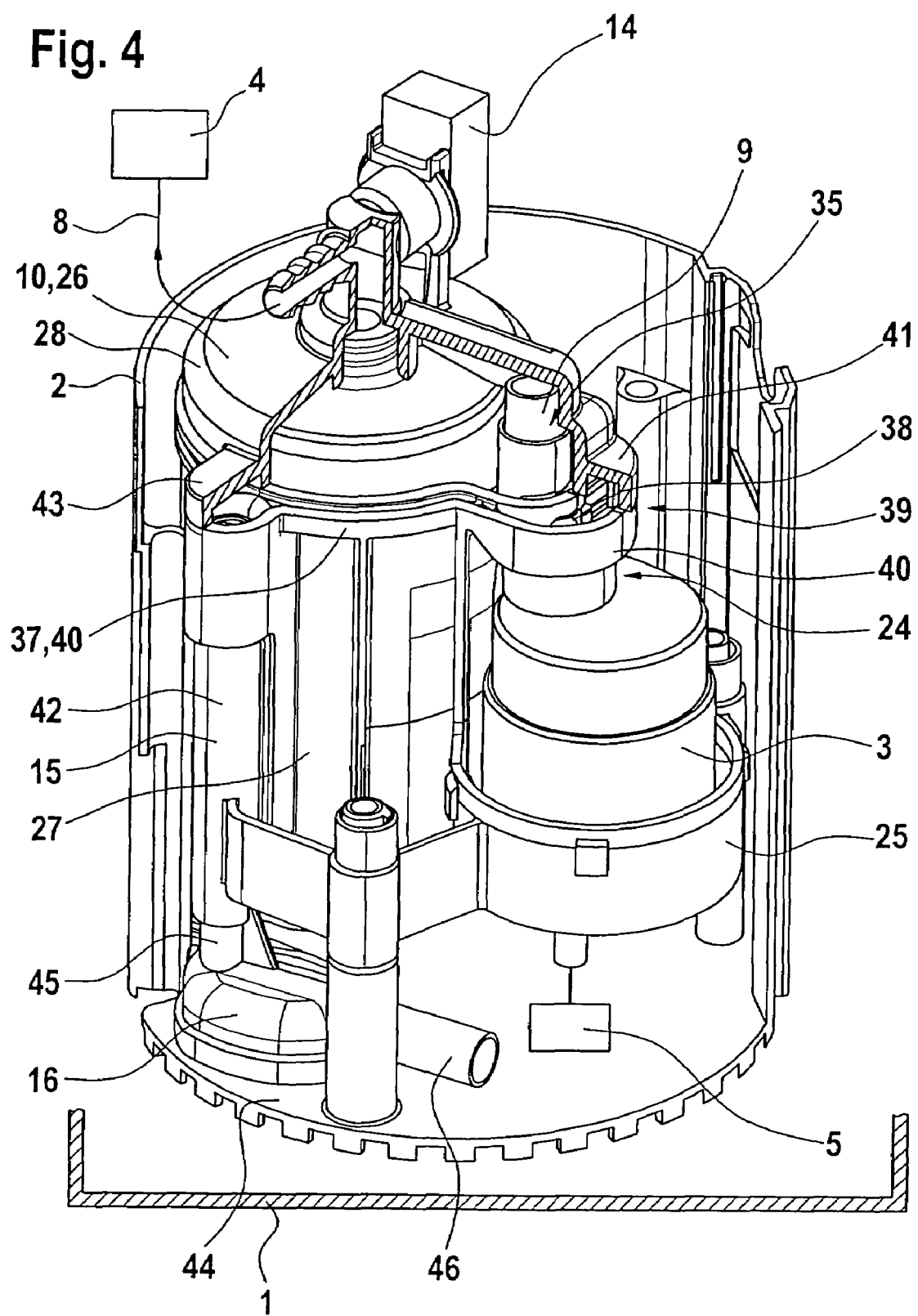

FIG. 4 shows a second section through the fuel delivery device according to the invention in the embodiment according to FIG. 1.

In the device according to FIG. 4, parts that are the same or function in the same manner as those in the device according to FIGS. 1 through 3 have been provided with the same reference numerals.

FIG. 4 shows the annular course of the first segment 37 of the drive line 15.

Figure 5:
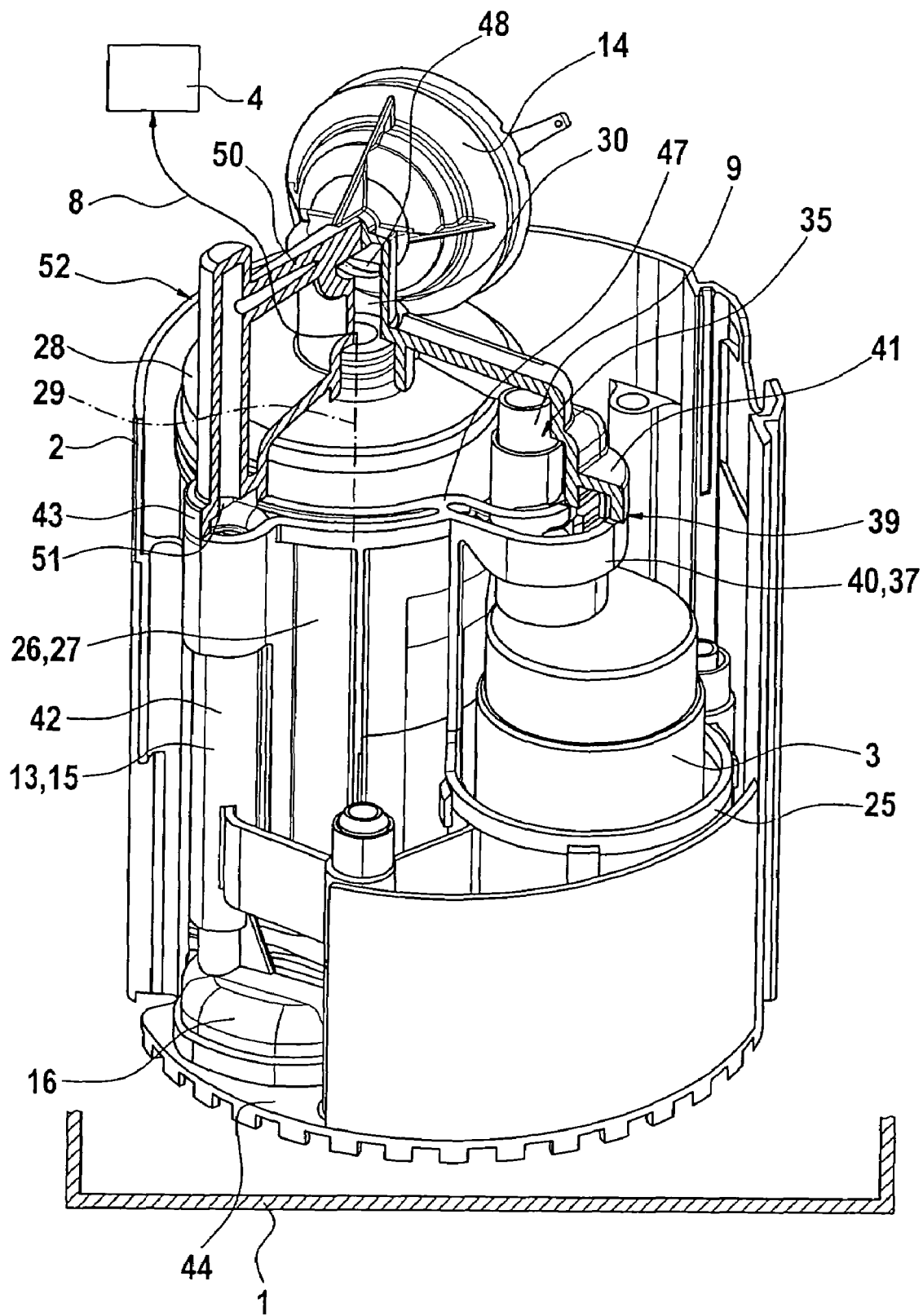
FIG. 5 depicts a device for delivering fuel according to the second embodiment.

FIG. 5 shows a section through the fuel delivery device according to the invention in the embodiment according to FIG. 2.

In the device according to FIG. 5, parts that are the same or function in the same manner as those in the device according to FIGS. 1 through 4 have been provided with the same reference numerals.

The device according to FIG. 5 differs from the device according to FIG. 3 and FIG. 4 in that the drive line 15 branches from the pressure line 8 downstream of the main filter 10; the pressure relief valve 14 permits fuel to flow into the drive line 15 as soon as the pressure in the pressure line 8 exceeds a predetermined value.

As a result of the altered flow routing, in the second exemplary embodiment, a filter lid 28 is used that is different from the one in the first embodiment according to FIG. 3 and FIG. 4, but for example the same filter bowl 27 is used as in FIG. 3 and FIG. 4. This corresponds to the use of the so-called modular principle, in which as many shared components as possible are used for different embodiments.

According to the invention, the different flow routing according to FIG. 5 is achieved essentially by replacing the filter lid 28, but it is also possible for additional and/or other parts to be different, too.

In the second embodiment, in order to prevent fuel from being able to flow via the first segment 37 directly into the second segment 42 of the drive line 15, in the embodiment according to FIG. 5, for example, the opening 38 is closed in relation to the drive line 15 or the first segment 37 of the drive line 15 is tightly sealed off from the second segment 42 of the drive line 15 by means of a bulkhead 47 situated in the first segment 37.

According to the second embodiment, at the filter outlet 30 of the filter lid 28, in addition to the connection fitting—not shown in FIG. 5—for connecting to the internal combustion engine 4, there is also a pressure control valve 14, for example a diaphragm pressure regulator. The pressure of the filter outlet 30 acts via a valve inlet 48 on a valve-closure member, for example a diaphragm, of the pressure control valve 14. If the pressure in the filter outlet 30 exceeds a predetermined value, the pressure control valve 14 opens and allows fuel to flow out of the filter outlet 30, through the valve inlet 48 and a valve seat that is not shown, into an additional segment 50 of the drive line 13, 15.

The additional segment 50 of the drive line 13, 15 extends, for example leading from the valve seat cooperating with the valve-closure member, outward radially in relation to the filter axis 29, for example in a straight line. After a bend 52 in the additional segment 50, for example of 90°, the additional segment 50 extends in the axial direction and has a bulge 43 situated at its end oriented toward the filter bowl 27. The bulge 43 of the filter lid 28, which seals the end of the second segment 42 according to the first embodiment in FIGS. 3 and 4, is connected, according to the second embodiment in FIG. 5, to the second segment 42 of the drive line 15 via a connecting opening 51. The additional segment 50 of the drive line 15 is situated, for example, so that downstream of the bend 52, it is aligned with the second segment of the drive line 15.

Depending on whether the filter lid 28 according to the first embodiment in FIGS. 3 and 4 or the filter lid 28 according to the second embodiment in FIG. 5 is used, a different flow routing to the suction jet pump 16 is produced in the device; however, no separate lines, for example hoses or corrugated pipes, are required between the delivery unit 3 and the filter outlet 30 and between the pressure line 8 and the suction jet pump 16. This simplifies assembly to a considerable degree and significantly reduces assembly and manufacture costs.

The embodiment of the drive line 15 in the filter housing 26 is thus advantageous because the drive line 15 according to the first embodiment branches off upstream of the filter housing 26 and according to the second embodiment, branches off downstream of the filter housing 26. In order to make use of the modular principle, therefore, the branch point of the drive line 15 from the pressure line 8 to the suction jet pump 16 is provided in the filter bowl 27 according to the first embodiment and is provided in the filter lid 28 according to the second embodiment. Both embodiments use the second segment 42 of the drive line 15 in the filter bowl 27. In the second embodiment, the first segment 37 of the drive line 15 is sealed off by the bulkhead 47 and is therefore unused. Instead of flowing into the second segment 42 of the drive line 15 via the first segment 37, the fuel flows into it via the additional segment 50.

The foregoing relates to a preferred exemplary embodiment of the invention, it being understood that other variants and embodiments thereof are possible within the spirit and scope of the invention, the latter being defined by the appended claims.

The invention claimed is:

1. In a device for delivering fuel from a tank to an internal combustion engine, having a delivery unit, a main filter in a filter housing situated downstream of the delivery unit, and a drive line for driving a suction jet pump, wherein the drive line is embodied in the filter housing of the main filter, wherein the filter housing comprises a filter bowl and a filter lid that closes the filter bowl, wherein the filter bowl and the filter lid have a common joining surface, and wherein the drive line is embodied at the joining surface in the filter bowl and/or the filter lid.

2. The device according to claim 1, wherein the delivery unit comprises an outlet fitting that protrudes into a filter inlet of the filter housing.

3. The device according to claim 2, wherein the filter inlet is flow-connected to the drive line via an opening.

4. In a device for delivering fuel from a tank to an internal combustion engine, having a delivery unit, a main filter in a filter housing situated downstream of the delivery unit, and a drive line for driving a suction jet pump, wherein the drive line is embodied in the filter housing of the main filter, wherein the filter housing comprises a filter bowl and a filter lid that closes the filter bowl, and wherein the drive line is embodied in the filter bowl and/or the filter lid, wherein the filter bowl comprises a first shoulder on its end oriented toward the filter lid and the filter lid corn rises a second shoulder on its side oriented toward the filter bowl, and wherein the first shoulder and the second shoulder rest against each other in flange fashion, and wherein a first segment of the drive line is provided in the first shoulder of the filter bowl and/or in the second shoulder of the filter lid.

5. The device according to claim 4, further comprising a pressure line which leads from the delivery unit via a check valve to the internal combustion engine, the first segment being connected to the pressure line upstream of the check valve.

6. The device according to claim 5, wherein the drive line comprises a throttle element and/or an additional prefilter.

7. The device according to claim 4, wherein a second segment of the drive line is provided in the filter bowl, the second segment extending from the first shoulder of the filter bowl in the direction of a bowl bottom of the filter bowl.

8. The device according to claim 7, wherein the filter lid comprises a pressure control valve downstream of the main filter, an additional segment of the drive line which leads from the pressure control valve and is connected to the second segment of the drive line, and a bulkhead sealing off the first segment of the drive line from the second segment.

* * * * *